(12) United States Patent
Oswald et al.

(10) Patent No.: US 11,647,327 B2
(45) Date of Patent: May 9, 2023

(54) BACKREST SPEAKERS

(71) Applicant: Bose Corporation, Framingham, MA (US)

(72) Inventors: Charles Terence Henry Oswald, Salem, NY (US); Bradford Kyle Subat, Northborough, MA (US); Muhammad Haris Usmani, Waltham, MA (US); Nicholas K. Lade, Waltham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/333,056

(22) Filed: May 28, 2021

(65) Prior Publication Data

US 2021/0377654 A1    Dec. 2, 2021

Related U.S. Application Data

(60) Provisional application No. 63/032,983, filed on Jun. 1, 2020.

(51) Int. Cl.
| | | |
|---|---|---|
| *H04R 1/34* | (2006.01) | |
| *H04R 1/02* | (2006.01) | |
| *B60N 2/64* | (2006.01) | |
| *B60R 11/02* | (2006.01) | |
| *B60N 2/803* | (2018.01) | |
| *B60R 11/00* | (2006.01) | |

(52) U.S. Cl.
CPC ............... *H04R 1/345* (2013.01); *B60N 2/64* (2013.01); *B60N 2/803* (2018.02); *B60R 11/0217* (2013.01); *H04R 1/02* (2013.01); *B60R 2011/0015* (2013.01); *H04R 2499/13* (2013.01)

(58) Field of Classification Search
CPC .......... H04R 1/02; H04R 1/028; H04R 1/345; H04R 2499/13; B60R 11/0217; B60R 2011/0015; B60N 2/64; B60N 2/803; B60N 2/879; B60N 2002/905
See application file for complete search history.

(56) References Cited

U.S. PATENT DOCUMENTS

| | | | |
|---|---|---|---|
| 2,908,766 | A | 10/1959 | Taylor |
| 3,792,754 | A | 2/1974 | Hanson |
| (Continued) | | | |

FOREIGN PATENT DOCUMENTS

| | | |
|---|---|---|
| CN | 205033978 U | 2/2016 |
| DE | 69829943 T2 | 3/2006 |
| (Continued) | | |

OTHER PUBLICATIONS

PCT International Search Report and Written Opinion for International Application No. PCT/US2021/034701, dated Sep. 15, 2021, 17 pages.

(Continued)

*Primary Examiner* — Oyesola C Ojo
(74) *Attorney, Agent, or Firm* — Hoffman Warnick LLC

(57) ABSTRACT

Various implementations include seats and related loudspeaker assemblies. In particular cases, a seat includes: a seat headrest portion; a seat backrest portion; and a loudspeaker assembly associated with the backrest portion. The loudspeaker assembly can have an acoustic directivity angled upward above a nominal ear position of an occupant.

25 Claims, 4 Drawing Sheets

(56) References Cited

U.S. PATENT DOCUMENTS

| | | | |
|---|---|---|---|
| 4,210,784 A | 7/1980 | Phillips | |
| 4,440,443 A | 4/1984 | Nordskog | |
| 4,868,888 A | 9/1989 | Dayton | |
| 6,136,879 A | 10/2000 | Nishida et al. | |
| 6,681,024 B2* | 1/2004 | Klein | H04R 5/02 381/301 |
| 7,819,480 B2 | 10/2010 | Asbury et al. | |
| 8,654,997 B2 | 2/2014 | Meehan et al. | |
| 8,668,045 B2 | 3/2014 | Cohen | |
| 8,913,777 B2 | 12/2014 | Pelliccio et al. | |
| 9,517,732 B2* | 12/2016 | Silzle | H04R 1/025 |
| 9,699,537 B2 | 7/2017 | Oswald et al. | |
| 10,455,327 B2 | 10/2019 | Oswald et al. | |
| 10,596,941 B2 | 3/2020 | Kakishima et al. | |
| 10,721,554 B2* | 7/2020 | Groleau | B60N 2/879 |
| 10,730,422 B2 | 8/2020 | Oswald et al. | |
| 10,909,963 B2* | 2/2021 | Christoph | G10K 11/17881 |
| 11,178,488 B2* | 11/2021 | Watanabe | H04R 1/345 |
| 11,343,602 B2* | 5/2022 | Winton | H04R 1/026 |
| 2004/0021350 A1 | 2/2004 | House | |
| 2005/0286735 A1 | 12/2005 | Ikeuchi | |
| 2007/0098205 A1 | 5/2007 | Holmi et al. | |
| 2008/0018162 A1 | 1/2008 | Galbreath et al. | |
| 2009/0295202 A1 | 12/2009 | Takada et al. | |
| 2010/0072795 A1 | 3/2010 | Meixner et al. | |
| 2010/0244511 A1 | 9/2010 | Gomes et al. | |
| 2011/0228959 A1 | 9/2011 | Meehan et al. | |
| 2012/0051579 A1 | 3/2012 | Cohen | |
| 2013/0101823 A1 | 4/2013 | Sanderson et al. | |
| 2013/0140862 A1* | 6/2013 | Silzle | H04R 1/323 297/217.5 |
| 2014/0203611 A1 | 7/2014 | Kondrad et al. | |
| 2014/0219492 A1 | 8/2014 | Pelliccio et al. | |
| 2014/0355783 A1 | 12/2014 | Subat | |
| 2015/0201260 A1 | 7/2015 | Oswald et al. | |
| 2017/0072869 A1* | 3/2017 | Ito | H04R 5/023 |
| 2017/0334708 A1 | 11/2017 | Cheon | |
| 2018/0035185 A1* | 2/2018 | Fujita | A47C 7/38 |
| 2018/0118063 A1* | 5/2018 | Oswald | B64D 11/00154 |
| 2018/0297248 A1 | 10/2018 | Morgan et al. | |
| 2020/0128312 A1 | 4/2020 | Christoph et al. | |
| 2020/0189436 A1* | 6/2020 | Soltner | H04R 1/025 |
| 2020/0317104 A1 | 10/2020 | Oswald et al. | |

FOREIGN PATENT DOCUMENTS

| | | |
|---|---|---|
| EP | 2003923 B8 | 10/2015 |
| EP | 2989808 A1 | 3/2016 |
| JP | S55176595 U | 12/1980 |
| JP | S5798092 U | 6/1982 |
| JP | 2001146136 A | 5/2001 |
| JP | 2004097654 A | 4/2004 |
| JP | 2007221485 A | 8/2007 |
| JP | 2008173998 A | 7/2008 |
| JP | 2009094824 A | 4/2009 |
| WO | 2014158711 A1 | 10/2014 |
| WO | 2014193685 A1 | 12/2014 |
| WO | 2015108860 A1 | 7/2015 |
| WO | 2016089665 A1 | 6/2016 |
| WO | 2017160594 A1 | 9/2017 |
| WO | 2019146254 A1 | 8/2019 |

OTHER PUBLICATIONS

International Search Report and Written Opinion for PCT Application No. PCT/US2022/028337, dated Aug. 1, 2022, 17 pages.

* cited by examiner

BACKREST SPEAKERS

PRIORITY CLAIM

This application claims priority to U.S. Provisional Patent Application No. 63/032,983 (filed on Jun. 1, 2020), which is herein incorporated by reference in its entirety.

TECHNICAL FIELD

This disclosure generally relates to seats that include acoustic output devices such as speakers. More particularly, the disclosure relates to loudspeakers incorporated into a backrest of the seat.

BACKGROUND

Conventional seats, for example, in vehicles, entertainment venues, and other locations, focus on user support and comfort. In some cases, these seats integrate speakers for providing audio output. However, these conventional seats fail to provide a consistent, satisfactory acoustic output to a range of distinct users and/or seating positions.

SUMMARY

All examples and features mentioned below can be combined in any technically possible way.

Various implementations include seats and vehicles including seats. In particular cases, the seats include a loudspeaker assembly with an acoustic directivity angled upward above a nominal ear position of an occupant.

In some particular aspects, a seat includes: a seat headrest portion; a seat backrest portion; and a loudspeaker assembly associated with the backrest portion and having an acoustic directivity angled upward above a nominal ear position of an occupant.

In other particular aspects, a method includes providing an acoustic output in a seat having a loudspeaker assembly associated with a backrest portion of the seat, wherein the acoustic directivity of the output is angled upward above a nominal ear position of an occupant.

Implementations may include one of the following features, or any combination thereof.

In certain aspects, the acoustic directivity is angled upward higher than an expected ear position of approximately 80% of a population of potential occupants.

In some cases, the acoustic directivity is angled upward higher than an expected ear position of approximately 90% of a population of potential occupants.

In particular implementations, the acoustic directivity is angled upward higher than an expected ear position of approximately 95% of a population of potential occupants.

In certain cases, the acoustic directivity is angled upward higher than an expected ear position of approximately 97% of a population of potential occupants.

In some implementations, the acoustic directivity is angled upward at an angle of at least 20 degrees above horizontal.

In certain aspects, the acoustic directivity is angled upward at an angle of at least 26 degrees above horizontal.

In particular cases, the acoustic directivity is angled upward at an angle of at least 36 degrees above horizontal.

In some aspects, the acoustic directivity is angled upward at an angle of at least 40 degrees above horizontal.

In certain implementations, the loudspeaker assembly is positioned such that a center of an acoustic output of the acoustic assembly is less than 600 mm vertically higher than a hip point of the vehicle seat.

In some aspects, the loudspeaker assembly is positioned such that a center of an acoustic output of the acoustic assembly is less than 575 mm vertically higher than a hip point of the vehicle seat.

In particular cases, the loudspeaker assembly includes: at least one loudspeaker (or, driver) for generating an acoustic output; and an acoustic outlet (or, exit) fixed in the seat backrest portion and angled to provide the acoustic output with the acoustic directivity angled upward above the nominal ear position of the occupant.

In certain implementations, the angle of the loudspeaker provides the acoustic output to achieve a consistent frequency response across a range of positions deviating from the nominal ear position.

In certain cases, the consistent frequency response is characterized by a high frequency (HF) consistency greater than an HF consistency for an acoustic output provided to the nominal ear position.

In certain implementations, the acoustic output from the seat has a MF frequency response variation that is less than a MF frequency response variation for the acoustic output provided to the nominal ear position. In additional aspects, the consistent frequency response is further characterized by a LF consistency equal to or greater than a LF consistency for an acoustic output provided to the nominal ear position.

In particular cases, HF is equal to approximately 4 kiloHertz (kHz) or more, and LF is equal to approximately 1 kHz or less. In certain examples, a mid-range frequency (MF) is equal to approximately 1 kHz to approximately 4 kHz.

In some aspects, the consistent frequency response is characterized by at least one of: inter-aural isolation for the occupant, head turn isolation for the occupant, or seat-to-seat isolation between multiple occupants of a space including the seat. In particular cases, the consistent frequency response includes a frequency response of the loudspeaker assembly.

In certain implementations, the seat includes two loudspeaker assemblies, and the seat-to-seat isolation is maintained by both loudspeaker assemblies in the seat.

In certain implementations, the at least one loudspeaker is located proximate the acoustic exit.

In some cases, the acoustic exit is fixed relative to the seat backrest portion.

In certain aspects, the seat headrest portion is adjustable relative to the seat backrest portion.

In particular implementations, the seat backrest extends above a nominal shoulder of the occupant.

In some aspects, the seat is one of: a vehicle driver seat, a vehicle passenger seat, an entertainment venue seat, a gaming seat, or a home entertainment seat.

In certain implementations, the vehicle passenger seat is a seat in a ride sharing vehicle, a limousine, a bus, or a public transit vehicle. In particular cases, the vehicle passenger seat is one of a plurality of vehicle passenger seats, one or more of which includes the loudspeaker assembly. In some aspects, the vehicle passenger seats are arranged in a huddle-around configuration, such that one or more of the seats faces one another.

In certain cases, the seat backrest portion has a middle portion and two flanks extending from opposite sides of the middle portion, where without the occupant in the seat, a front surface of the backrest at each flank is angled relative to a front surface of the middle portion, and where the acoustic exit of the loudspeaker assembly is located in one of the flanks. In certain of these cases, the acoustic exit has an inward firing angle relative to the front surface of the middle portion.

In particular aspects, a vehicle includes the seat with the loudspeaker assembly.

In certain cases, the nominal ear position of the occupant is the expected seating position (or, location) for the occupant. In particular cases, this nominal ear position is equal to the ear position of the median American male. In additional cases, this nominal ear position is equal to the average of the ear position of the median American male and the median American female.

In some cases, the at least one loudspeaker is separated from the acoustic exit. In particular aspects, a channel or a waveguide is located between the driver and the exit, such that the driver is located closer to the base of the seat or the center of the seat than the acoustic exit.

In certain aspects, the positions deviating from the nominal ear position include lower positions associated with occupants sitting lower in the seat, or higher positions associated with occupants sitting higher in the seat.

In some implementations, the at least one loudspeaker has an upward firing angle relative to a horizontal plane intersecting the front surface of the seat backrest portion adjacent to the acoustic exit.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
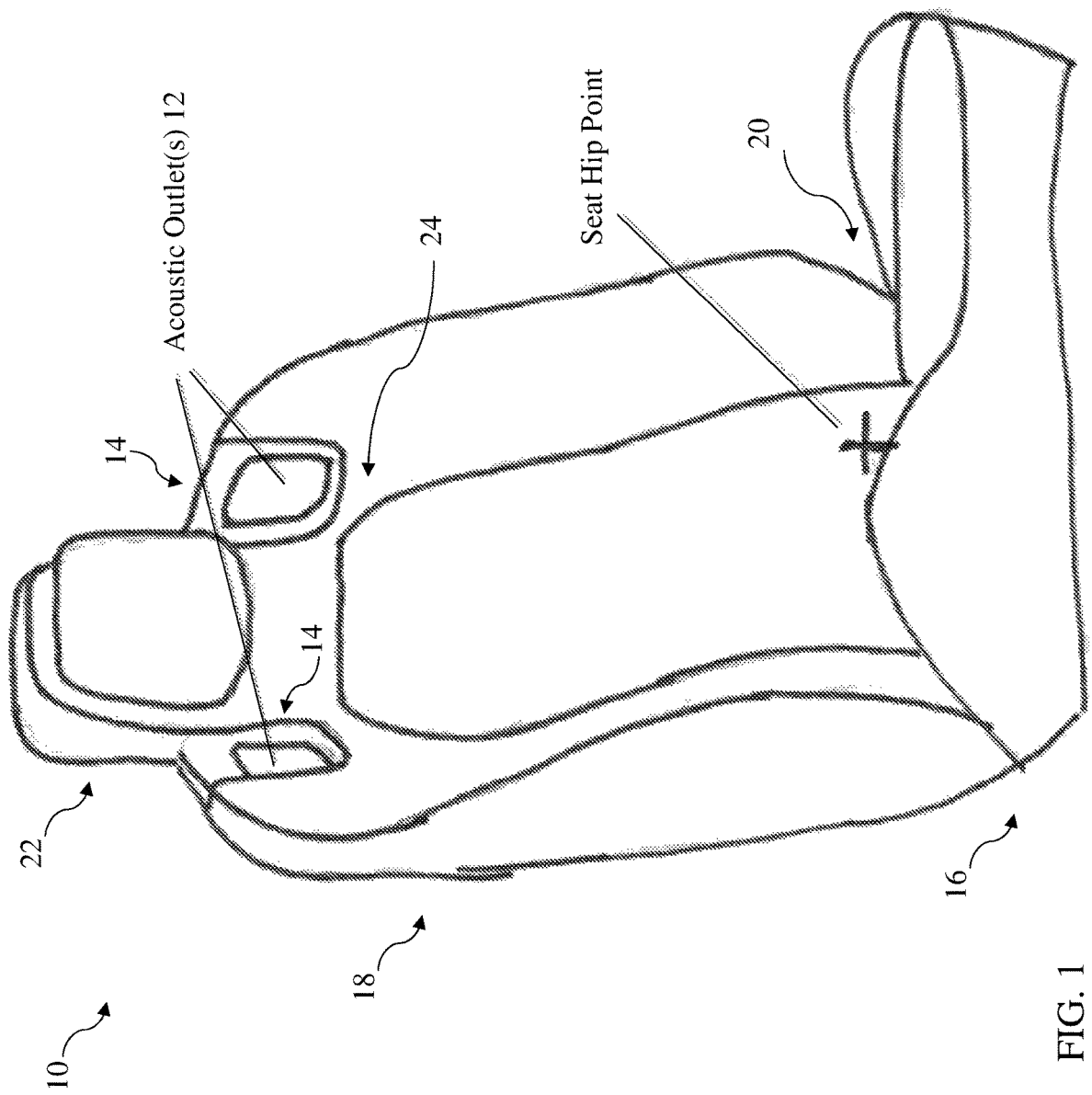
FIG. 1 is a perspective view of an example vehicle seat having backrest speakers, according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Commonly labeled components in the FIGURES are considered to be substantially equivalent components for the purposes of illustration, and redundant discussion of those components is omitted for clarity.

Seats, for example, vehicle seats (such as seats used in cars, trucks, buses, trains, aircraft, boats or other vehicles), entertainment venue seats (e.g., movie theater seats, sporting or concert venue seats, etc.), gaming seats, and/or home entertainment seats (e.g., home theater seats) can be fitted with acoustic transducers or speakers for delivering an acoustic experience. In some cases, speakers are fitted into seats such that the speakers are proximate to the ears of an occupant of the seat. In some cases, speakers are integrated within seat headrests or headrest wings. Such headrest speakers can provide excellent acoustic performance (e.g., in terms of providing inter-seat isolation and/or binaural control, e.g., inter-aural parameter control) by virtue of being close to the ears of the seat occupant. However, for some seats (e.g., some vehicle seats), headrest speakers may not be the best choice. For example, mechanical and electrical integration may be challenging in some cases. Some headrests are designed to be thin and low-bulk and may not have enough volume to accommodate headrest speakers. Headrest speakers may cause the seat or headrest to have a high center of mass (and thereby possibly needing additional seat reinforcements). Speakers may compete with other mechanical components of the headrest. In addition, wiring headset speakers through headrest connectors may be challenging for some seats.

Seat speakers may also be integrated, at least in part, in a backrest of a vehicle seat. Some such speakers may be disposed on a top surface of a backrest or otherwise very near the top surface, e.g., as close to the ears as possible, and configured to radiate acoustic energy towards a nominal ear position of a seat occupant. From an integration perspective, backrest speakers may be preferred over headrest speakers in some cases, for example, because they have a lower center of mass than headrest speakers, may be easier to integrate into seats due to more available space in the seat backrest and/or because unlike headrest speakers, the associated wiring does not need to be passed through the headrest posts.

The technology described in this document allows for leveraging the advantages of backrest speakers in an improved manner such that may rival or beat the acoustic performance of headrest speakers. Examples disclosed herein provide a broadly acceptable acoustic performance across a range of potential occupants by conveying acoustic energy with a directivity aimed at a relatively high angle as compared to those directed to a nominal ear position. In some examples, an acoustic assembly may include an enclosure or mounting point, one or more loudspeakers, and one or more acoustic channels that convey acoustic energy from the speakers to exits disposed in the seat backrests to a region closer to the ears of the seat occupant. The acoustic assembly is configured to provide a directionality at a relatively high angle, aimed higher than a nominal ear position of an expected group of occupants.

Systems and methods in accord with the examples described herein may combine the integration advantages of backrest speakers while producing an acoustic performance better than those that direct acoustic energy at the nominal ear position. In various examples, high angled loudspeakers and/or acoustic assemblies incorporated into a backrest may provide acoustic performance comparable or better than headrest speakers.

FIG. 1 illustrates a seat 10 having acoustic outlets 12, e.g., from an acoustic channel of an acoustic assembly 14 (within seat 10), or in some cases directly from one or more acoustic transducers. Also annotated in FIG. 1 is an approximate location of a hip point, as discussed in greater detail below. The seat 10 can include a base 16, a backrest portion 18 connected with the base 16 (e.g., and configured to pivot and/or slide relative to a pivot point 20), and a headrest portion 22 connected with the backrest portion 18. The front surface 24 of the seat 10 is visible in FIG. 1. In certain implementations, the seat headrest portion 22 is adjustable relative to the seat backrest portion 18, e.g., for pivoting, raising and/or lowering to support user's with different head positions.

Figure 2:
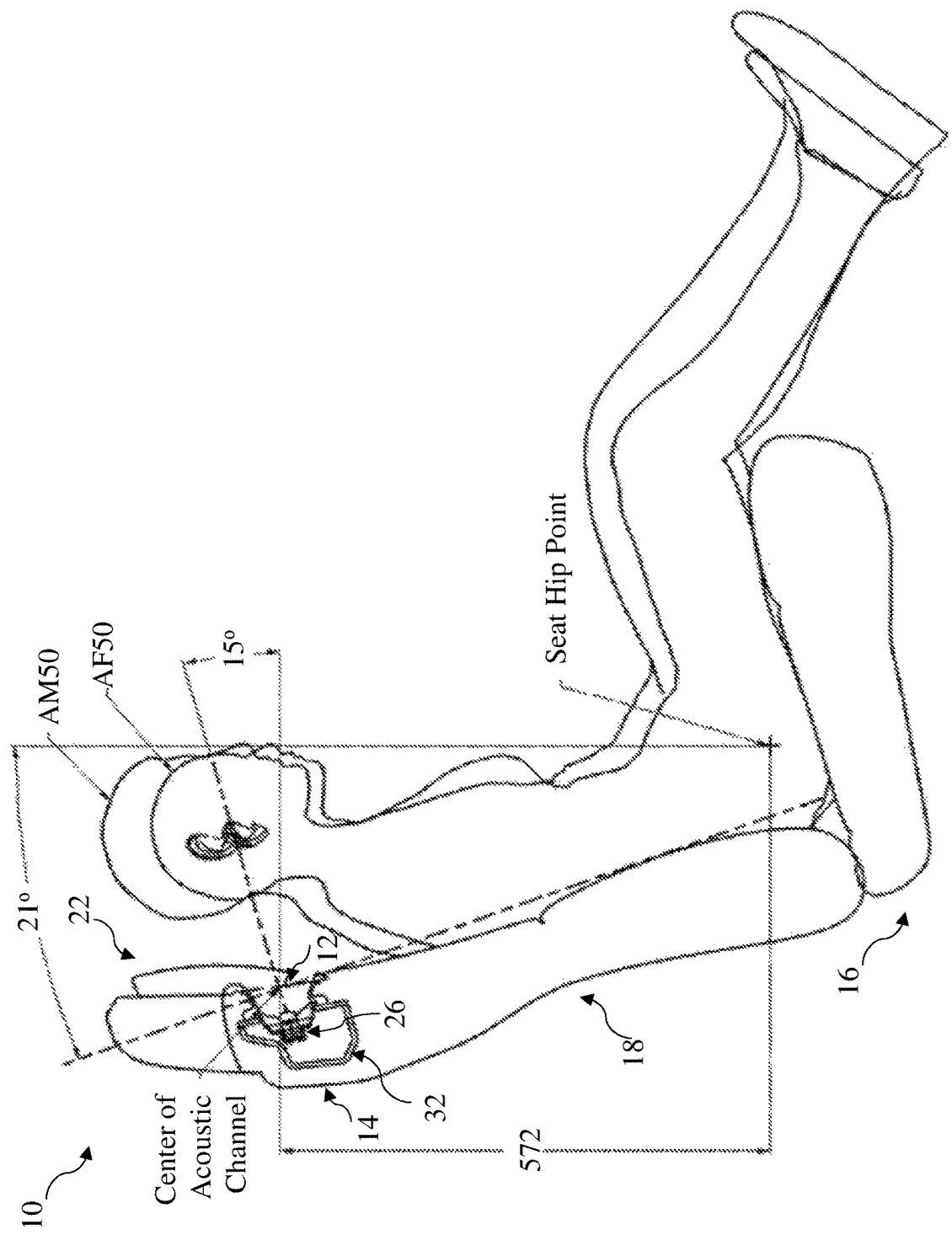
FIG. 2 is a schematic side view of a loudspeaker placement in a seat backrest at a nominal angle, according to various implementations.

FIG. 2 illustrates the seat 10 with a seatback (backrest portion 18) in a nominal operating position, such as to drive a vehicle, watch a performance or media presentation, participate in a gaming experience, etc., which may involve a reclining angle relative to the base 16 of about 21 degrees, in some examples. A relatively highly mounted loudspeaker 26 in the backrest portion 18 is positioned to be aimed at a nominal ear position.

As used herein, the term "nominal ear position" is based upon a mid-way point between the ear positions of a typical male and a typical female of a given population. For such purposes, the term "typical" may mean the median ($50^{th}$ percentile) ear positions relative to the seat, which may be relative to a headrest surface and/or hip point when seated (e.g., as may be defined by SURFACE VEHICLE STANDARD J826, titled, "Devices for Use in Defining and Measuring Vehicle Seating Accommodation, dated November 2015, available from SAE International). For the purposes of illustration, the subject population used herein is American adults.

With reference to FIG. 2, positioning of a median adult male is annotated as AM50. Half of the adult male American population is expected to have a higher ear position and half lower. Positioning of a median adult female is annotated as AF50. Half of the adult female population is expected to have a higher ear position and half lower. In particular examples, the nominal ear position is selected based on the median of the American male population, or AM50.

The loudspeaker 26 in FIG. 2 is positioned at a height relatively near the nominal ear position (or slightly below), with a center of the acoustic channel at the output of the acoustic channel (the acoustic output) located at a height vertically about 572 millimeters (mm) above the hip point. The loudspeaker 26 is oriented to aim (e.g., firing direction, axis of the loudspeaker) at the nominal ear position, which in this example with the backrest portion 18 reclined is an upward tilt of about 15 degrees relative to the horizontal plane intersecting the acoustic outlet 12 while the seat 10 is in the 21 degree recline position. The loudspeaker 26 position in FIG. 2 is effective to avoid being blocked by the occupant's shoulders but may exhibit drastically different acoustic performance across a range of height and ear positions of different occupants. For example, shorter individuals may have an ear position directly in front of the loudspeaker 26 while taller individuals may have an ear position significantly higher and further away from the loudspeaker 26.

Systems and methods in accord with various particular implementations herein achieve more consistent acoustic performance across a range of occupants than does the relatively high and shallow-angled speaker shown in FIG. 2.

Figure 3:
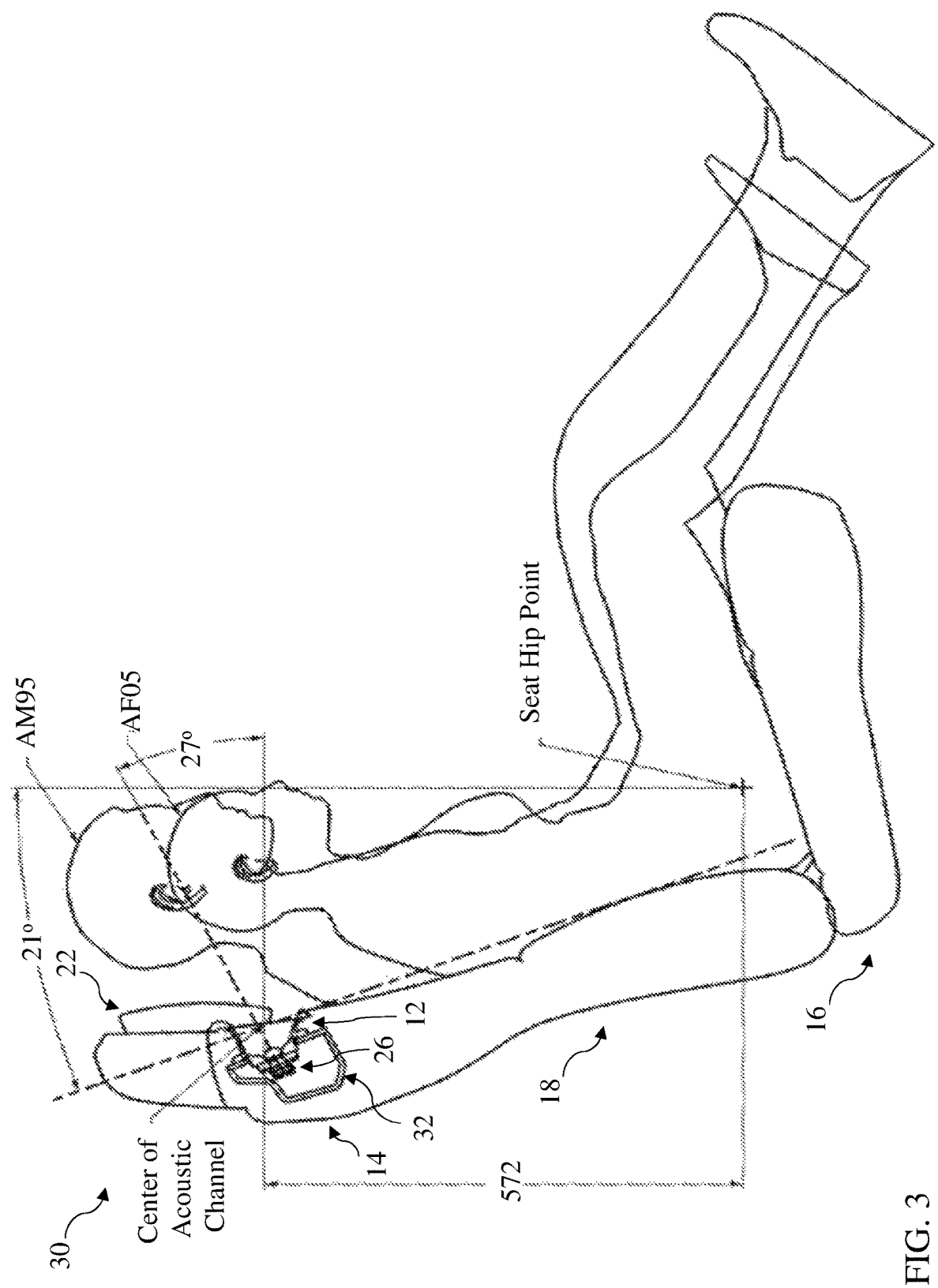
FIG. 3 is a schematic side view of an example loudspeaker placement in a seat backrest at an increased angle, according to various implementations.

FIG. 3 illustrates a loudspeaker 26 in the backrest portion 18 of a seat 30 at a similar position to that of FIG. 2, but aimed at an ear position of a taller individual. In this example, the loudspeaker 26 is aimed at an expected ear position of a 95th percentile adult male (annotated AM95). Accordingly, only 5% of the adult male American population will have a higher ear position. Additionally accounting for females, approximately 97% of the adult American population will have an ear position below the position where the loudspeaker is aimed in FIG. 3. AM95 indicates a location that is about 60 millimeters (mm) higher than AM50, while AF05 indicates a location that is about 116 mm lower than AM50.

The loudspeaker 26 in the seat 30 in FIG. 3 is oriented at an upward angle relative to horizontal. In this example, the loudspeaker can be oriented at an upward angle of about 22 to about 32 degrees relative to horizontal, in more particular cases about 25 to about 29 degrees relative to horizontal, and in even more particular cases about 27 degrees relative to horizontal (last example illustrated). This is based upon the loudspeaker's position and the expected ear position of the 95th percentile adult male. According to various additional examples, the upward angle may be greater than about 40 degrees, or may be in a range of about 20 to about 60 degrees, or may be in a range of about 30 to about 50 degrees, or about 35 to about 45 degrees, or may be in a range of about 37 to about 42 degrees. In various examples, the loudspeaker 26 may also be angled inward, e.g., left to right, relative to a vertical reference, or centerline.

In various examples, the loudspeaker 26 may be positioned in combination with an enclosure 32 mounted in the backrest portion 18, or a mounting plate or other suitable mechanical arrangement. In some examples, a void in the backrest portion 18 may serve as an acoustic volume that affects a tuning of the loudspeaker 26.

In various examples (not shown) an acoustic channel may be included that conveys acoustic energy from a mounting position of the loudspeaker 26 to, or near, a front surface of the backrest portion 18 (e.g., proximate outlets 12), which may be covered by a grill in some examples and/or by a covering of the backrest portion 18 according to various examples. Such an acoustic channel may have increasing cross section, e.g., getting larger the further from the loudspeaker, and as generally illustrated in FIG. 3. In other examples, an acoustic channel may have varying shapes and may have decreasing or substantially constant cross section.

In certain cases, the loudspeaker 26 is located proximate (e.g., next to, or adjacent to) the acoustic outlet (or, exit) 12. However, this proximity is not required. That is, in various additional implementations, the loudspeaker (or, driver) 26 can be physically separated from the acoustic outlet 12, e.g., by several centimeters (cm) or more. In certain cases, the loudspeaker 26 is separated from the acoustic outlet 12 by 10 mm, 20 mm, 30 mm, 40 mm, 50 mm or more. In particular cases, an acoustic channel or a waveguide (not shown) connects the loudspeaker 26 and the exit 12, such that the loudspeaker 26 is located closer to the base 18 of the seat than the exit 12, or the loudspeaker 26 is internally mounted in the seat backrest portion 18 e.g., near the mid-point between the base 18 and the headrest portion 22.

In various examples, an acoustic channel, enclosure, and/or void in the backrest portion 18 may impact the directivity of the loudspeaker 26. Such arrangements may be deemed an acoustic assembly in general and references to directivity herein may refer to the directivity of such an acoustic assembly when installed, unless the context clearly indicates otherwise. In some examples, such as when an acoustic channel does not occlude the loudspeaker 26 (e.g., does not get in the way of a direct line from the loudspeaker to the ear, see, e.g., FIG. 3), the directivity of the acoustic assembly may be substantially the same as the directivity of the loudspeaker 26, especially at higher frequencies where the acoustic output becomes more directional. In some examples, therefore, the directivity of the acoustic assembly may be substantially aligned with an axis of the loudspeaker 26.

In certain examples, two or more loudspeakers 26 may be provided as part of an acoustic assembly. Suitable signal processing may allow the two or more loudspeakers 26 to be driven in a manner that enables control of the directivity of the acoustic output. For clarity, such is intended to refer to the number of loudspeakers 26 for each of a left and right side, such as two or more loudspeakers 26 per side.

Figure 4:
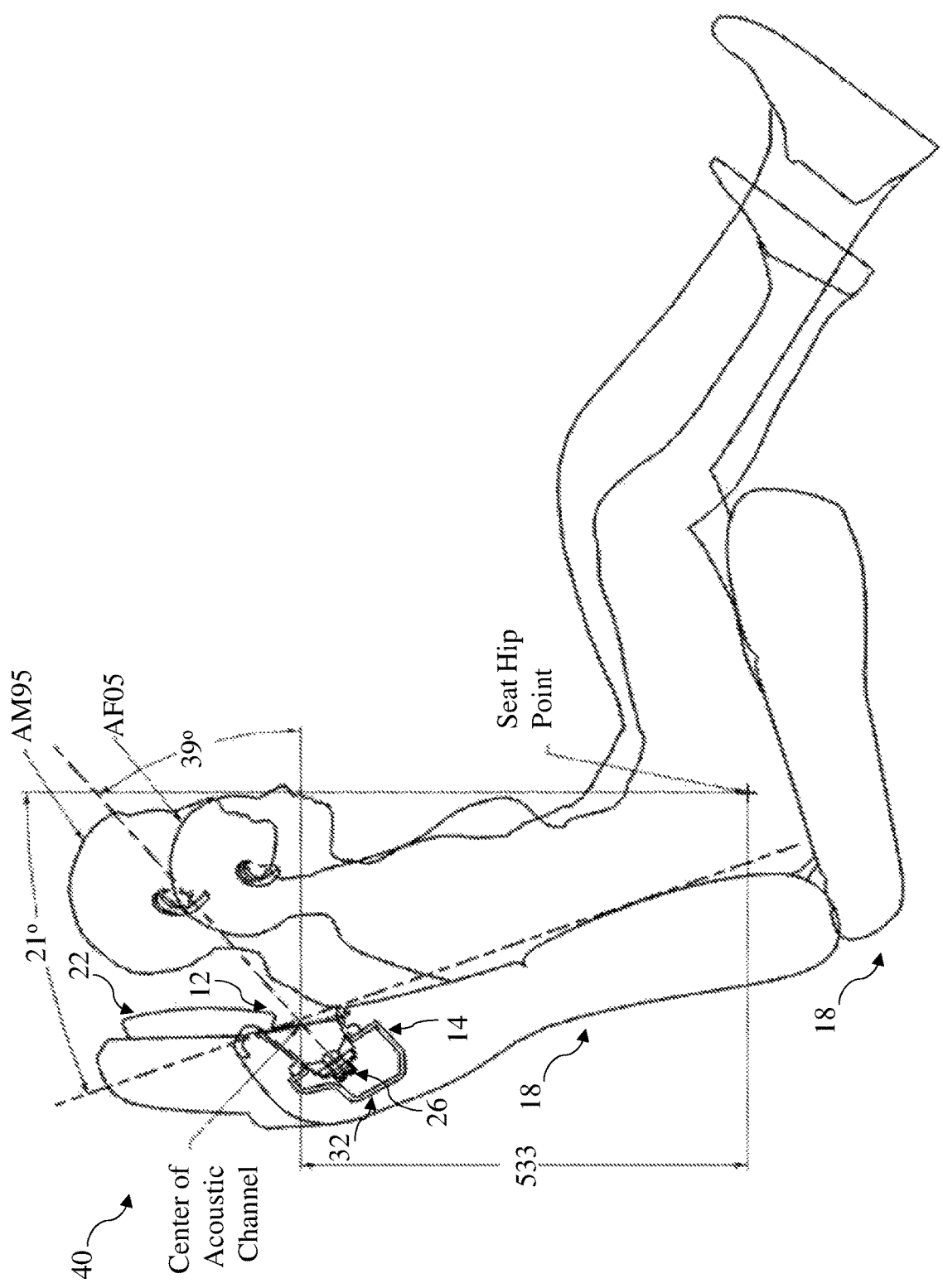
FIG. 4 is a schematic side view of a further example loudspeaker placement in a seat backrest at an increased angle, according to various implementations.

FIG. 4 illustrates a loudspeaker 26 in the backrest portion 18 of a seat 40 at a lower position to that of FIG. 3, but also aimed at the expected ear position of the taller individual (AM95). The loudspeaker 26 in the seat 40 shown in FIG. 4 is therefore oriented at an upward angle of about 34 to about 44 degrees relative to horizontal, and in some particular cases, about 37 to about 41 degrees relative to horizontal, and in further particular cases, about 39 degrees relative to horizontal (last example illustrated). This is based upon the loudspeaker's lower position (relative to FIG. 3) and the expected ear position of the 95th percentile adult male. The loudspeaker position and orientation combinations illustrated in FIGS. 3 and 4 may provide a better acoustic performance across a range of individuals than that of FIG. 2. Relative to the FIG. 2 configuration, the loudspeaker 26 in the assembly in FIGS. 3 and 4 may be closer to an ear position of shorter individuals but the orientation of the loudspeaker 26 means that an ear position of taller individuals is more in line with the directivity of the loudspeaker 26 (or the acoustic assembly).

Accordingly, as an occupant's height and ear position varies, a trade-off occurs between distance from the loudspeaker 26 and alignment with the directivity of the loudspeaker(s) 26 and/or acoustic assembly. This provides a benefit because the designer of the vehicle seat does not know the position of the occupant's ear because many different occupants may use the vehicle seat at different times. Accordingly, the seatback speakers in accord with the examples described herein are beneficial for not knowing where the occupant's ear is located and may provide substantially equal acoustic performance regardless of the occupant's ear position, e.g., regardless of who uses the seat.

While an ear position of a taller individual is further from the loudspeaker 26, it may also be closer to a roof or headliner of an environment (e.g., a vehicle, a room, etc.), and may benefit from acoustic reinforcement from the headliner (and/or roof). Additionally, the taller individual's shoulders may be positioned nearer to being in front of the loudspeaker 26 and may also provide acoustic reinforcement. For completeness, relatively shorter individuals may have an ear position closer to the loudspeaker 26 and thus not require acoustic reinforcement. Accordingly, the loudspeaker 26 may be suitably positioned lower in the backrest, in accord with some of the examples described herein.

FIGS. 3 and 4 illustrate the position of a center of an acoustic output by height measured vertically from the hip point of the seats 30, 40, respectively, in millimeters. The heights in these examples are about 572 mm and about 533 mm, respectively, vertically higher than the hip point. It is understood that these heights can vary according to certain implementations, and can be configured to vary with adjustment of the upward firing angle of loudspeaker 26, as well as the inward firing angle of loudspeaker 26, relative to the centerline that bisects the backrest.

In various examples, the loudspeaker 26 may be positioned such that the center of an acoustic output is less than about 600 mm vertically above the hip point, or may be positioned less than about 575 mm vertically above the hip point, or less than about 550 mm, or about 525 mm, or less than about 500 mm above the hip point. In some examples, the center of the output of the acoustic assembly (which may be an end of the acoustic channel) may be between about 375 mm and about 600 mm vertically above the hip point, or may be between about 400 mm and about 575 mm vertically above the hip point, or between about 425 mm and about 550 mm, or between about 450 mm and about 525 mm vertically above the hip point. For reference, such measurements above the hip point may be measured straight up, vertically, for the backrest in a nominal position, such as about 21 degrees declined from vertical, as illustrated the figures.

As noted herein, the seats (e.g., seat 10, seat 30, seat 40) can be one or more of: a vehicle driver seat, a vehicle passenger seat, an entertainment venue seat, a gaming seat, and/or a home entertainment seat. In certain implementations, a vehicle passenger seat is a seat in a ride sharing vehicle, a limousine, a bus, or a public transit vehicle. In particular cases, the vehicle passenger seat is one of a plurality of vehicle passenger seats, one or more of which includes the loudspeaker assembly. In some aspects, the vehicle passenger seats are arranged in a huddle-around configuration, such that one or more of the seats faces one another.

In certain cases, seat(s) disclosed herein can serve multiple purposes, e.g., as a gaming seat and a home entertainment seat (e.g., in a home theater). In additional cases, the seat 10, 30, 40 can be one of a plurality of seats in a vehicle, which may include similar components and/or capabilities. Various seating configurations can benefit from aspects of the seat(s) illustrated according to various implementations, including among others: stadium seating in entertainment venues, multi-passenger vehicle seating configurations (e.g., where seat(s) are used for the driver and/or passengers), home entertainment configurations (e.g., where a row or plurality of seat(s) are arranged), and others. In certain cases, the seat(s) disclosed herein can benefit from being located in a cabin or other closed space such as in a vehicle cabin (or, cab). Certain acoustic benefits can be realized in such cabin configurations. However, many of the benefits of the seat(s) disclosed herein can be realized in other seating configurations and other environments.

In certain cases, the acoustic outlet of the loudspeaker assemblies in FIGS. 1-4 is fixed in the seat backrest portion 18 and in particular cases, is fixed relative to the seat backrest portion 18. This configuration fixes the firing angle of the loudspeaker 26 relative to the seat occupant, regardless of the incline/recline angle of the seat backrest portion 18 relative to the base 16.

In certain cases, the acoustic outlet 12 of loudspeaker assemblies in FIG. 2-4 can be separated from a centerline of the seat backrest portion 18 by approximately 180 mm to approximately 330 mm. In particular cases, the acoustic exit of each loudspeaker assembly is separated from the centerline of the seat backrest portion by approximately 200 mm in a narrower case, and approximately 300 mm in a wider case.

The loudspeaker position and orientation combinations illustrated in FIGS. 2-4, and in particular cases, the loudspeaker position and orientation illustrated in seats 30 and 40 in FIGS. 3 and 4, may provide a better acoustic performance across a range of individuals than conventional seatback speakers. The loudspeaker may be closer to an ear position of shorter individuals but the orientation of the loudspeaker means that an ear position of taller individuals is more in line with the directivity of the loudspeaker (or the acoustic assembly).

Accordingly, as an occupant's height and ear position varies, a trade-off occurs between distance from the loudspeaker and alignment with the directivity of the loudspeaker(s) and/or acoustic assembly. This provides a benefit because the designer of the vehicle seat does not know the position of the occupant's ear because many different occupants may use the vehicle seat at different times. Accordingly, the seatback speakers in accord with the examples described herein are beneficial for not knowing where the occupant's ear is located and may provide substantially equal acoustic performance regardless of the occupant's ear position, e.g., regardless of who uses the seat.

Further, while an ear position of a taller individual is further from the loudspeaker, it may also be closer to a roof or headliner of a vehicle, and may benefit from acoustic reinforcement from the headliner (and/or roof). Additionally, the taller individual's shoulders may be positioned nearer to being in front of the loudspeaker and may also provide acoustic reinforcement. For completeness, relatively shorter individuals may have an ear position closer to the loudspeaker and thus not require acoustic reinforcement. Accordingly, the loudspeaker may be suitably positioned lower in the backrest, in accord with some of the examples described herein.

As noted herein, in certain cases such as illustrated in FIG. 3 and FIG. 4, the angle of the at least one loudspeaker 26 provides the acoustic output to achieve a consistent frequency response across a range of positions deviating from the nominal ear position. For example, the consistent frequency response can be characterized by a high frequency (HF) consistency greater than an HF consistency for an acoustic output provided to the nominal ear position. In certain additional cases, the acoustic output from the seat 30, 40 has a HF frequency response variation equal to or less than approximately two-thirds to three-quarters of a HF frequency response variation for the acoustic output provided to the nominal ear position (e.g., approximately 11 to approximately 12 dBSPL/V for seats 30, 40 as compared with approximately 15 dBSPL/V for seat 10). In these examples, HF is approximately 4 kilo-Hertz (kHz) to approximately 20 kHz or more, and LF is equal to approximately 1 kHz or less. In still further implementations, the consistent frequency response is further characterized by a LF consistency equal to or greater than a LF consistency for an acoustic output provided to the nominal ear position. For example, the frequency response variation for the LF range can be approximately 5 percent to approximately 20 percent less in seats 30, 40 as compared with seat 10 (e.g., approximately 3.5 dBSPL/V for seats 30, 40 as compared with approximately 4 to 4.5 dBSPL/V for seat 10).

In still further examples, the seat 30, 40 is a vehicle seat, with an inboard loudspeaker assembly (driver 26 closer to the center of the vehicle cabin) and an outboard loudspeaker assembly (driver 26 closer to the vehicle's external wall or door). According to various implementations, for the loudspeaker assembly positioned in the outboard location, the LF consistency of the acoustic output from the seat 30, 40 is greater than the LF consistency for the acoustic output provided to the nominal ear position.

Additional features of backrest speakers can be found in U.S. Pat. No. 10,730,422, which is incorporated herein by reference in its entirety. Further features of backrest speakers can be found in U.S. patent application Ser. No. 17/333,057 ("Seatback Speakers"; filed concurrently herewith on May 28, 2021), which is incorporated herein by reference in its entirety. Further description of seating positions and acoustic parameters of occupants in seats can be found in U.S. Pat. No. 10,455,327 ("Binaural Measurement System"), which is incorporated herein by reference in its entirety.

Certain components in the disclosed systems may not be depicted, but are understood to enable various additional functions. For example, systems can include additional electronics including but not limited to power source(s), processors, memory, communications components such as transmitters/receivers, network connection equipment (including but not limited to: Wi-Fi, Bluetooth, cellular or near field communications (NFC) equipment) and location-identification components (e.g., GPS systems). Additionally, systems disclosed herein can include one or more interfaces allowing user interaction that includes one or more conventional inputs, such as haptic inputs including a dial, button, touch screen, etc. The interface can also include a voice command interface, such that the user can make adjustments using voice commands. The interface can also include a gesture-based interface, such that the user can make adjustments with gestures (e.g., hand wave, nodding, etc.).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A seat comprising:
a seat headrest portion;
a seat backrest portion; and
a loudspeaker assembly associated with the seat backrest portion and having an acoustic directivity angled upward above a nominal ear position of an occupant, wherein the acoustic directivity is angled upward higher than an expected ear position of approximately 80% of a population of potential occupants,
wherein an angle of the acoustic directivity provides an acoustic output to achieve a consistent frequency response across a range of positions deviating from the nominal ear position, wherein the consistent frequency response is characterized by a high frequency (HF) consistency greater than an HF consistency for an acoustic output provided to the nominal ear position, wherein HF is equal to or greater than approximately 4 kilo-Hertz (kHz).

2. The seat of claim 1, wherein the acoustic directivity is angled upward higher than an expected ear position of approximately 90% of the population of potential occupants.

3. The seat of claim 1, wherein the acoustic directivity is angled upward higher than an expected ear position of approximately 95% of the population of potential occupants.

4. The seat of claim 1, wherein the acoustic directivity is angled upward higher than an expected ear position of approximately 97% of the population of potential occupants.

5. The seat of claim 1, wherein the angle of the acoustic directivity is at least 36 degrees above horizontal.

6. The seat of claim 1, wherein the angle of the acoustic directivity is at least 40 degrees above horizontal.

7. The seat of claim 1, wherein the loudspeaker assembly is positioned such that a center of the acoustic output of the acoustic assembly is less than 600 mm vertically higher than a hip point of the seat, while the backrest portion is declined about 21 degrees from vertical.

8. The seat of claim 1, wherein the loudspeaker assembly is positioned such that a center of the acoustic output of the acoustic assembly is less than 575 mm vertically higher than a hip point of the seat, while the backrest portion is declined about 21 degrees from vertical.

9. The seat of claim 1, wherein the loudspeaker assembly comprises:
at least one loudspeaker for generating the acoustic output; and
an acoustic exit fixed in the seat backrest portion and angled to provide the acoustic output with the acoustic directivity angled upward above the nominal ear position of the occupant.

10. The seat of claim 9, wherein the at least one loudspeaker is located proximate the acoustic exit.

11. The seat of claim 9, wherein the at least one loudspeaker is separated from the acoustic exit.

12. The seat of claim 9, wherein the acoustic exit is fixed relative to the seat backrest portion, wherein the loudspeaker assembly comprises a pair of separate loudspeaker assemblies on opposing sides of a centerline of the seat backrest portion, and wherein each of the pair of separate loudspeaker assemblies is separated from the centerline by approximately 200 mm to approximately 300 mm, and wherein the consistent frequency response is further characterized by a low frequency (LF) consistency of approximately 5 percent to approximately 20 percent less than a LF consistency for the acoustic output provided to the nominal ear position.

13. The seat of claim 1, wherein the seat headrest portion is adjustable relative to the seat backrest portion.

14. The seat of claim 1, wherein the seat backrest portion extends above a nominal shoulder of the occupant.

15. The seat of claim 9, wherein the angle of the at least one loudspeaker is oriented at an upward angle of about 34 degrees to about 44 degrees relative to horizontal.

16. The seat of claim 15, wherein the angle of the at least one loudspeaker is oriented at an upward angle of about 37 to about 41 degrees relative to horizontal.

17. An automobile seat comprising:
a seat headrest portion;
a seat backrest portion; and
a loudspeaker assembly associated with the backrest portion and having an acoustic directivity angled upward above a nominal ear position of an occupant, wherein the loudspeaker assembly includes: at least one loudspeaker for generating an acoustic output; and an acoustic exit fixed in the seat backrest portion and angled to provide the acoustic output with the acoustic directivity angled upward above the nominal ear position of the occupant,
wherein the acoustic directivity is angled upward higher than an expected ear position of approximately 95% of a population of potential occupants,
wherein an angle of the at least one loudspeaker provides the acoustic output to achieve a consistent frequency response across a range of positions deviating from the nominal ear position, wherein the consistent frequency response is characterized by a high frequency (HF) consistency greater than an HF consistency for an acoustic output provided to the nominal ear position, wherein HF is equal to or greater than approximately 4 kilo-Hertz (kHz), and wherein a roof or a headliner of the vehicle provides acoustic reinforcement for the user to maintain the HF consistency.

18. The automobile seat of claim 17, wherein the loudspeaker assembly is positioned such that a center of an acoustic output of the acoustic exit is less than 575 mm vertically higher than a hip point of the vehicle seat while the backrest portion is declined about 21 degrees from vertical.

19. The automobile seat of claim 18, wherein the loudspeaker assembly is positioned such that a center of an acoustic output of the acoustic exit is between about 450 mm and about 525 mm vertically higher than a hip point of the vehicle seat while the backrest portion is declined about 21 degrees from vertical, and wherein the consistent frequency response is further characterized by a low frequency (LF) consistency of approximately 5 percent to approximately 20 percent less than a LF consistency for an acoustic output provided to the nominal ear position.

20. A seat comprising:
a seat headrest portion;
a seat backrest portion; and
a loudspeaker assembly associated with the seat backrest portion and having an acoustic directivity angled upward above a nominal ear position of an occupant,
wherein the acoustic directivity is angled upward higher than an expected ear position of approximately 80% of a population of potential occupants,
wherein an angle of the acoustic directivity provides the acoustic output to achieve a consistent frequency response across a range of positions deviating from the nominal ear position, wherein the consistent frequency response is characterized by at least one of: inter-aural isolation for the occupant, head turn isolation for the occupant, or seat-to-seat isolation between multiple occupants of a space including the seat.

21. The seat of claim 20, wherein the angle of the acoustic directivity is at least 36 degrees above horizontal.

22. The seat of claim 20, wherein the angle of the acoustic directivity is at least 40 degrees above horizontal.

23. The seat of claim 20, wherein the loudspeaker assembly comprises:
at least one loudspeaker for generating the acoustic output; and
an acoustic exit fixed in the seat backrest portion and angled to provide the acoustic output with the acoustic directivity angled upward above the nominal ear position of the occupant.

24. The seat of claim 23, wherein the at least one loudspeaker is oriented at an upward angle of about 34 degrees to about 44 degrees relative to horizontal.

25. The seat of claim 23, wherein the at least one loudspeaker is oriented at an upward angle of about 37 to about 41 degrees relative to horizontal.

* * * * *